United States Patent
Han et al.

(10) Patent No.: US 9,660,524 B2
(45) Date of Patent: May 23, 2017

(54) SYSTEM AND METHOD FOR ESTIMATING OUTPUT CURRENT OF DC-DC CONVERTER

(71) Applicants: Hyundai Motor Company, Seoul (KR); Kia Motors Corporation, Seoul (KR)

(72) Inventors: Daewoong Han, Anyang (KR); Sangkyu Lee, Seoul (KR); Jaehwa Jeon, Hwaseong Gyeonggi-Do (KR); Jeongbin Yim, Anyang (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 579 days.

(21) Appl. No.: 14/139,054

(22) Filed: Dec. 23, 2013

(65) Prior Publication Data

US 2014/0365151 A1 Dec. 11, 2014

(30) Foreign Application Priority Data

Jun. 10, 2013 (KR) .................. 10-2013-0065872

(51) Int. Cl.
*G01R 19/00* (2006.01)
*H02M 3/156* (2006.01)
*H02M 1/00* (2006.01)

(52) U.S. Cl.
CPC .... *H02M 3/156* (2013.01); *H02M 2001/0009* (2013.01)

(58) Field of Classification Search
CPC ............ G01R 19/0092; G01R 19/2513; G01R 21/133; G01R 19/25; G06F 1/3203
See application file for complete search history.

(56) References Cited

U.S. PATENT DOCUMENTS

2008/0309302 A1* 12/2008 Chen ............... H02M 1/38
323/282
2010/0156356 A1* 6/2010 Asakura ............... H01M 2/16
320/148

FOREIGN PATENT DOCUMENTS

JP 2011-223701 A 11/2011
KR 10-2004-0107952 A 12/2004

* cited by examiner

*Primary Examiner* — Roy Y Yi
(74) *Attorney, Agent, or Firm* — Mintz Levin Cohn Ferris Glovsky and Popeo, P.C.; Peter F. Corless

(57) ABSTRACT

A DC-DC converter and a method for estimating output current of a DC-DC converter are provided. The method includes measuring, by a controller, input voltage and output voltage of the DC-DC converter and measuring output voltage of a current transformer (CT) included in the DC-DC converter. In addition, the method includes compensating, by the controller, for the output voltage based on the relationship between the measured output voltage and CT output voltage and compensating for the input voltage by measuring the input current of the DC-DC converter based on the output current of the DC-DC converter into the CT output voltage converted through the current transformer and using an output current map composed of the output voltage and the measured CT voltage. In addition, the output current is estimated using the compensated output voltage and input voltage.

10 Claims, 12 Drawing Sheets

FIG.9

|  |  | Input voltage(Vin) | | |
|---|---|---|---|---|
|  |  | 210[V] | 270[V] | 310[V] |
| Output voltage compensation CT output voltage ($V_{CT\_new}$) | 0[V] | 0[A] | 0[A] | 0[A] |
| | 1.2[V] | 9.6[A] | 10.8[A] | 12.1[A] |
| | ... | ... | ... | ... |
| | 4.8[V] | 175[A] | 200[A] | 215[A] |
| | 5.0[V] | 190[A] | 210[A] | 230[A] |

SYSTEM AND METHOD FOR ESTIMATING OUTPUT CURRENT OF DC-DC CONVERTER

CROSS-REFERENCE TO RELATED APPLICATION

This application claims priority to and the benefit of Korean Patent Application No. 10-2013-0065872 filed in the Korean Intellectual Property Office on Jun. 10, 2013, the entire contents of which are incorporated herein by reference.

BACKGROUND (a) Field of the Invention

The present invention relates to a system and method for estimating output current of a direct current-direct current (DC-DC) converter used for environmental-friendly vehicles such as a fuel cell vehicle, an electric vehicle, a plug-in electric vehicle, and a hybrid vehicle. More particularly, the present invention relates to a DC-DC converter that can perform an overcurrent protection function and a power derating function by directly applying an output current map to the output voltage of a current transformer based on the output voltage of the DC-DC converter without using an output current sensor, and by estimating output current more accurately using an output current sensor by minimizing an error due to the output voltage of the DC-DC converter through correction, and a method for estimating output current of a DC-DC voltage.

(b) Description of the Related Art

In general, it is known in the art that output current $I_{out}$ is required to be measured in real time to perform output overcurrent protection and power derating functions in a DC-DC converter. The measured output current $I_{out}$ is transmitted to a CPU (Central Processing Unit) that is in charge of a voltage control and protection function of the DC-DC converter and the CPU protects power parts in the DC-DC converter while performing overcurrent protection and output limit functions based on the measured output current.

Two known methods of measuring the output current $I_{out}$ of the DC-DC converter, are as follows. One method includes directly measuring output current using a current sensor mounted at the output terminal of the DC-DC converter. This method achieves more precise current sensing with an error at the level or ±1 A, but the use of the current sensor increase the overall material cost. Another method includes indirectly estimating the output current $I_{out}$ using a CT (Current Transformer) used for control and protection in DC-DC converters in the related art. Although this method does not use a current sensor, as shown in FIG. 1, in a DC-DC converter 10, the output current $I_{out}$ may be expressed by Equation 1 below showing the relationship between input power $P_{in}$, output power $P_{out}$, and efficiency η of the DC-DC converter 10, and from which, the output current is expressed by the relational expression of input voltage $V_{in}$, input current $I_{in}$, efficiency η, and output voltage $V_{out}$, as in Equation 2.

$$\eta = \frac{P_{out}}{P_{in}} = \frac{V_{out} \cdot I_{out}}{V_{in} \cdot I_{in}} \quad \text{Equation 1}$$

$$I_{out} = \frac{V_{in} \cdot I_{in} \cdot \eta}{V_{out}} \quad \text{Equation 2}$$

In the above equations, the amount of change of the input current $I_{in}$ can be sensed by a CT and converted into secondary voltage, as shown in FIG. 2, and is converted into new CT output voltage $V_{CT\_LPF}$ of 0-5V in an OP-AMP (Operation Amplifier) through an LPF (Low Pass Filter) of a controller 12 of the DC-DC converter 10, and is input to a CPU (e.g., a processor) of the controller 12 of the DC-DC converter 10. Accordingly, the parameters for the amount of change of the input current $I_{in}$ can be replaced with the CT output voltage and Equation 2 for the method of estimating output voltage, using a CT, described above may be schematized, as shown in FIG. 3. As a result, the output estimation value $I_{o\_est}$ can be calculated using Equation 2, schematized into FIG. 3 into a software logic in the CPU of the controller of the DC-DC converter 10, the output overcurrent protection and power derating functions an be performed.

However, according to the method of estimating output current, the measurement errors of the input voltage $V_{in}$, input current $I_{in}$, output voltage $V_{out}$, and efficiency η may be multiplied, causing the errors to be accumulated in the final output current estimation value $I_{o\_est}$, and as show in FIG. 3, an input current map and an efficiency map may change based on the output voltage $V_{out}$, causing the estimation error to increase unless error compensation is provided to the output voltage $V_{out}$. Further, even when the logic shown in FIG. 3 is implemented in the CPU of the controller of the DC-DC converter, the calculation equations are used excessively and the calculation load of the CPU increases.

As described above, as the estimation error of the output current increases, the function of using the output current value for the overcurrent protection and output limit value is operated abnormally and this may cause unstable control of the DC-DC converter.

The above information disclosed in this section is only for enhancement of understanding of the background of the invention and therefore it may contain information that does not form the prior art that is already known in this country to a person of ordinary skill in the art.

SUMMARY

The present invention provides a DC-DC converter and a method for estimating output current of a DC-DC voltage that may perform an overcurrent protection function and a power derating function by directly applying an output current map to the output voltage of a current transformer based on the output voltage of the DC-DC converter without using an output current sensor, and by estimating output current more accurately using an output current sensor by minimizing an error due to the output voltage of the DC-DC converter through correction, and a method for estimating output current of a DC-DC voltage.

An exemplary embodiment of the present invention provides a method for estimating output current of a DC-DC converter, which may include: measuring, by a controller, input voltage $V_{in}$ and output voltage $V_{out}$ of the DC-DC converter; measuring, by the controller, output voltage $V_{CT\_LPF}$ of a current transformer included in the DC-DC converter; compensating, by the controller, for the output voltage $V_{out}$ based on the relationship between the measured output voltage $V_{out}$ and CT output voltage $V_{CT\_LPF}$; compensating, by the controller, for the input voltage $V_{out}$ by measuring the input current of the DC-DC converter 100 based on the output current $I_{out}$ of the DC-DC converter 100 into the CT output voltage $V_{CT\_LPF}$ converted through the current transformer and by using an output current map composed of the output voltage $V_{out}$ and the measured CT voltage; and estimating, by the controller, output current $I_{out}$ using the compensated output voltage $V_{out}$ and input voltage $V_{in}$.

The relationship between the measured output voltage $V_{out}$ and the CT output voltage $V_{CT\_LPF}$ may be normalized into a linear equation, as shown in the following Equation (3), $$V_{CT\_new} = \left( \frac{(13.9 - V_{out})}{K_C} + 1 \right) \cdot V_{CT\_LPF} \qquad \text{Equation 3}$$

wherein $V_{CT\_new}$ is a changed output voltage of the current transformer due to a change in input voltage and/or output voltage and $K_C$ is a tuning coefficient. Compensation for the input voltage $V_{in}$ may be composed of three maps based on the range of the input voltage.

Another exemplary embodiment of the present invention provides a DC-DC converter equipped with an output current estimation device, in which the output current estimation device may include a plurality of units executed by a controller. The plurality of units may include an output voltage compensation unit and an output current map construction unit configured to compensate for input voltage $V_{in}$ and output voltage $V_{out}$ of the DC-DC converter and the output voltage compensation unit and the output current map construction unit may operated by predetermined programs that perform the method for estimating output current of a DC-DC converter.

The DC-DC converter may be configured to reduce output voltage to limit output power, when the output current estimation value estimated by the output current estimation device exceeds a predetermined current limit.

As described above, according to an exemplary embodiment of the present invention, a DC-DC converter may perform an overcurrent protection function and a power derating function by directly applying an output current map to the output voltage of a current transformer based on the output voltage of the DC-DC converter without using an output current sensor, and by estimating output current more accurately using art output current sensor by minimizing an error due to the output voltage of the DC-DC converter through correction.

BRIEF DESCRIPTION OF THE DRAWINGS

FIGS. 6 to 12 are exemplary views illustrating the operation of a DC-DC converter and a method of estimating output current according to an exemplary embodiment of the present invention.

DETAILED DESCRIPTION

Figure 1:
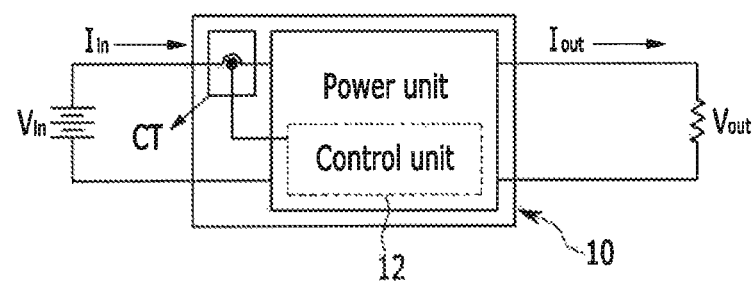
FIG. 1 is an exemplary schematic diagram of a common DC-DC converter according to the related art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles, fuel cell vehicles, and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Figure 4:
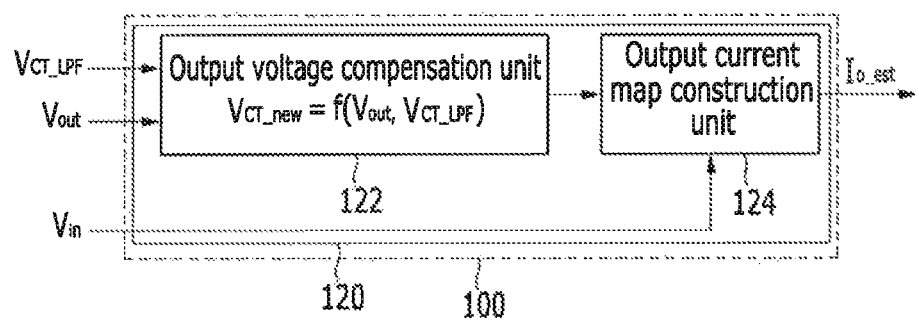
FIG. 4 is an exemplary schematic diagram of an output current estimation device of a DC-DC converter according to an exemplary embodiment of the present invention.

Hereinafter, the present invention will be described more fully hereinafter with reference to the accompanying drawings, in which exemplary embodiments of the invention are shown. However, the present invention is not limited to the exemplary embodiments described herein and may be embodied in other ways. Like reference numerals are given to like components throughout the specification. Through the present specification, unless explicitly described otherwise, "including" any components will be understood to imply the inclusion of other components rather than the exclusion of any other components, FIG. 4 is an exemplary schematic diagram of a DC-DC converter equipped with an output current estimation device according to an exemplary embodiment of the present invention. As shown in FIG. 4, an output current estimation device 120 of a DC-DC converter 100 may include a plurality of units executed by a controller. The plurality of units may include an output voltage compensation unit 422 and an output current map construction unit 124 configured to for input voltage $V_{in}$ and output voltage $V_{out}$ of the DC-DC converter 100.

The output current estimation device 120 may include one or more microprocessors operated by predetermined programs or hardware (e.g., the controller) including the microprocessors and the predetermined programs may be configured to operate the output voltage compensation unit 122 and the output current map construction unit 124 and may be configured by a set of instructions that perform the method for estimating output current of a DC-DC converter according to an exemplary embodiment of the present invention.

Figure 2:
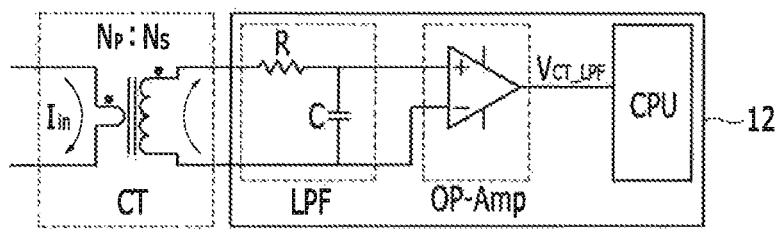
FIG. 2 is an exemplary diagram showing conversion relationship between input current of a common DC-DC converter and voltage of a CT (Current Transformer) according to the related art.
Figure 3:
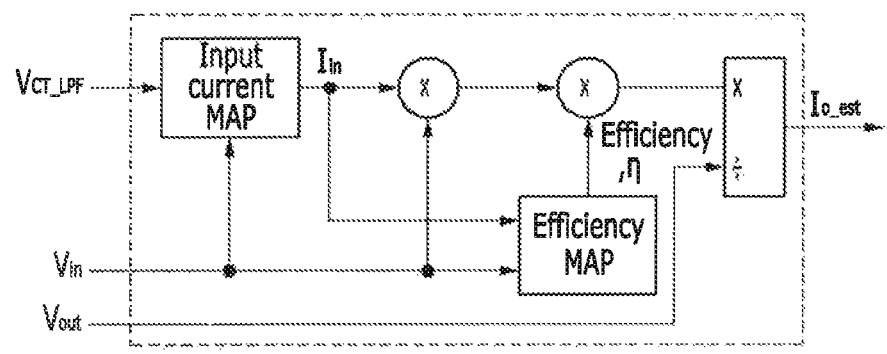
FIG. 3 is an exemplary schematic diagram showing an output current estimation logic of a DC-DC converter according to the related art.
Figure 5:
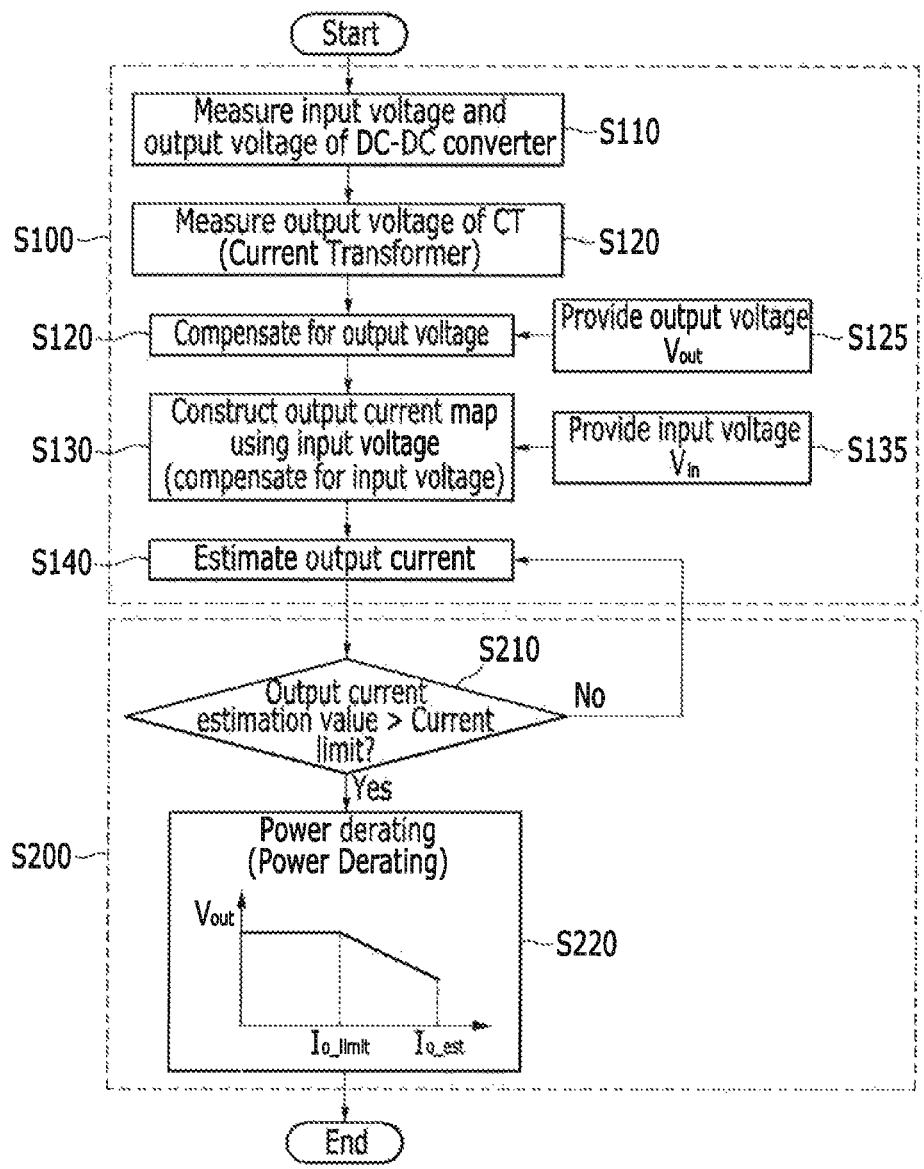
FIG. 5 is an exemplary schematic diagram of a method for estimating output current of a DC-DC converter according to an exemplary embodiment of the present invention.

The method for estimating output current of a DC-DC converter that may be configured by predetermined programs, for example, as shown in FIG. 5, may include measuring, by a controller, input voltage $V_{in}$ and output voltage $V_{out}$ of the DC-DC converter 100 (S110); measuring, by the controller, output voltage $V_{CT\_LPF}$ of a current transformer CT (see FIGS. 1 and 2) included in the DC-DC converter 100 (S120); compensating, by the controller, for the output voltage $V_{out}$ based on the relationship between the measured output voltage $V_{out}$ and the CT voltage $V_{CT\_LPF}$ (S120); compensating, by the controller, for the input voltage $V_{in}$ by measuring the input current $I_{in}$ of the DC-DC converter 100 based on the output current $I_{out}$ of the DC-DC converter 100 into the CT output voltage $V_{CT\_LPF}$ converted through the current transformer CT and using an output current map (see FIG. 10) composed of the output voltage $V_{out}$ and the measured CT voltage (S130); and estimating, by the controller, output current $I_{out}$ by using the compensated output voltage $V_{out}$ and input voltage $V_{in}$ (S140).

Output Voltage $V_{out}$ may be provided in S125 to compensate for the output voltage out and input voltage $V_{in}$ may be provided in S135 to compensate for the input voltage $V_{in}$. The method for estimating output current in an exemplary embodiment of the present invention may be implemented by the logic in S100 which is composed of S110 to S140 in FIG. 5.

According to another exemplary embodiment of the present invention, the DC-DC converter 100 may perform steps S210 and S220 that may reduce the output voltage to limit output power, when the output current estimation value estimated by the output current estimation device 120 exceeds a predetermined current limit.

Hereinafter, a method for estimating output current of a DC-DC converter which may be performed by the DC-DC converter according to an exemplary embodiment of the present invention is described in detail with reference to the accompanying drawings. The method for estimating output current of a DC-DC converter according to an exemplary embodiment of the present invention may be configured to estimate output current, directly using an output current map composed of output current and CT output current by measuring in real time the degree of change of load current under predetermined input voltage $V_{in}$ and output voltage $V_{out}$, that is, input current $I_{in}$ based on a change in output current $I_{out}$, into CT output voltage $V_{CT\_LPF}$ converted through the current transformer CT, by the output voltage compensation unit 122 and the output current map construction unit 124 of the output current estimation device 120, as shown in FIG. 4, not using Equation 2 to calculate power and output current $I_{out}$ from efficiency of the related art.

For the characteristics of the DC-DC converter 100, the CT output voltage may change based on input voltage and output voltage, even when a predetermined output current flows, to compensate the input voltage and the output voltage to estimate output current more accurately. Therefore, the output current estimation device 120 may be configured to normalize compensation for the output voltage from the relationship between the output current and the CT output voltage for the output voltage, with a linear equation, using Equation (3) below. Further, the output current estimation apparatus 120 may be configured to minimize an error in the estimation of the output voltage by categorizing the output current map into maps (e.g., three maps) for the minimum voltage, the rated voltage, and the maximum voltage based on the range of the input voltage.

$$V_{CT\_new} = \left( \frac{(13.9 - V_{out})}{K_C} + 1 \right) \cdot V_{CT\_LPF} \quad \text{Equation 3}$$

Wherein $V_{CT\_new}$ is the changed voltage of the current transformer CT due to a change in input voltage and/or output voltage and $K_c$ is a tuning coefficient.

The detail of compensation for the CT output voltage for the output voltage which may be performed by the output current estimation device 120 of the DC-DC converter 100 is as follows.

Figure 6:
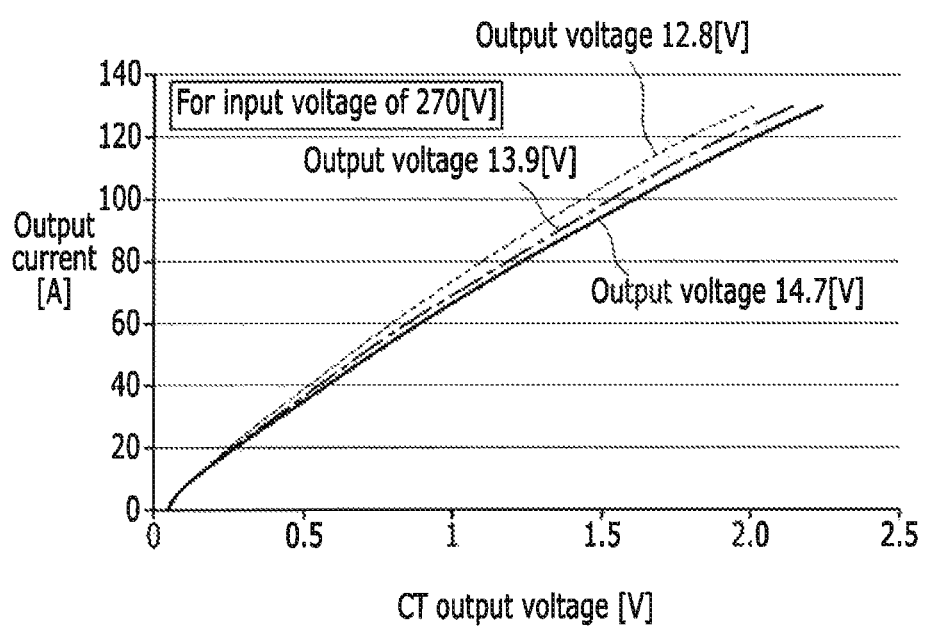

As known in the art, the CT voltage value may have a difference in inclination, as in FIG. 6, based on output voltage even for the same output current under a predetermined input voltage condition (e.g. input voltage condition of about 270 V). FIG. 6 is an exemplary graph showing CT output voltage to output current based on output voltage. In particular, FIG. 6 shows an exemplary CT output voltage curve to an increase in output current under three output voltage conditions, for example, at about 12.8 V, 13.9 V, and 14.7 V, The compensation for output voltage in an exemplary embodiment of the present invention is, as shown in FIG. 6, to obtain different CT output voltage curves uniform by normalizing the CT output voltage curves with reference to one output voltage. The output current estimation device 120 may be configured to perform normalization, as in FIG. 7, using Equation (3), for example, with reference to output voltage of about 13.9V. Further, Equation (3) may be normalized into a linear equation since errors in CT output voltage of about 12.8 V and 14.7 V are constant at the same output current with reference to about 13.9 V. In other words, two curves of the output voltage of about 12.8 V and 14.7 V may be normalized to about 13.9 V and three curves are shown as overlapping into one curve, as in FIG. 7.

Figure 7:
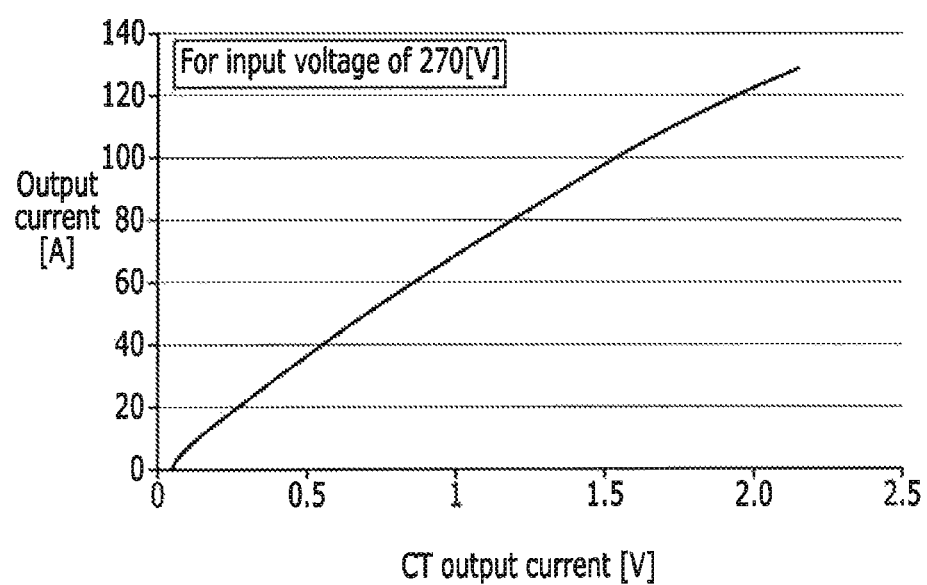

As described above, as normalization for about 13.9 V is performed by Equation (3) for the entire range of about 12.8-14.7 V of the output voltage of the DC-DC converter, the output voltages may be expressed as one curve, as in FIG. 7, and this value, which may be a new CT output value $V_{CT\_new}$, may be the input value of the output current map.

The new CT output value may be used for output current estimation by applying the output voltage compensation method based on the three input voltages as described above.

Figure 8:
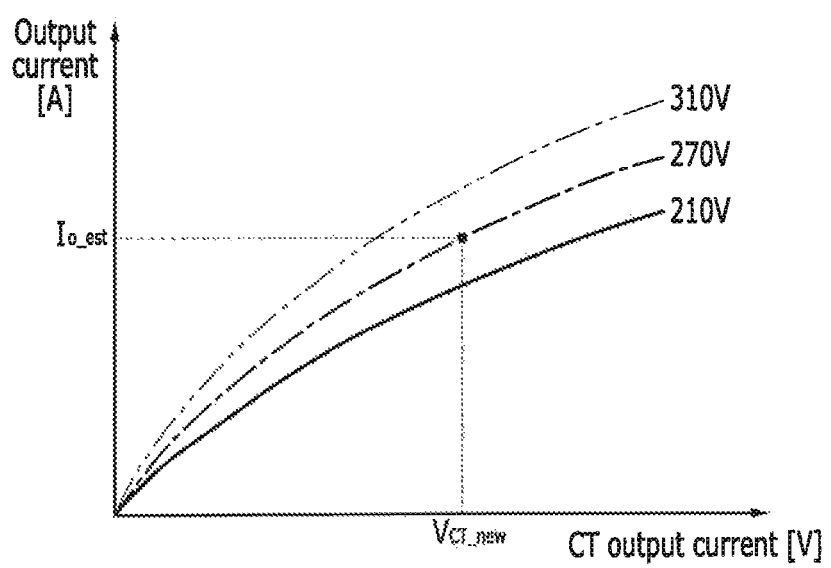

Next, the output current estimation based on changes in input voltage may construct an output current map for each input voltage, at three input voltages, that is, the minimum voltage, the rated voltage, and the maximum voltage. For example, by finding a CT output voltage curve normalized with referenced to output voltage of about 13.9 V for input voltages about 210 V, 270 V, and 310 V, three output current maps may be used, as shown in FIG. 8. When the maps are expressed in a look-up table for implementing software, the maps may be configured in an output current map table of 3×N (N is an integer), as shown in FIG. 9.

Figure 10:
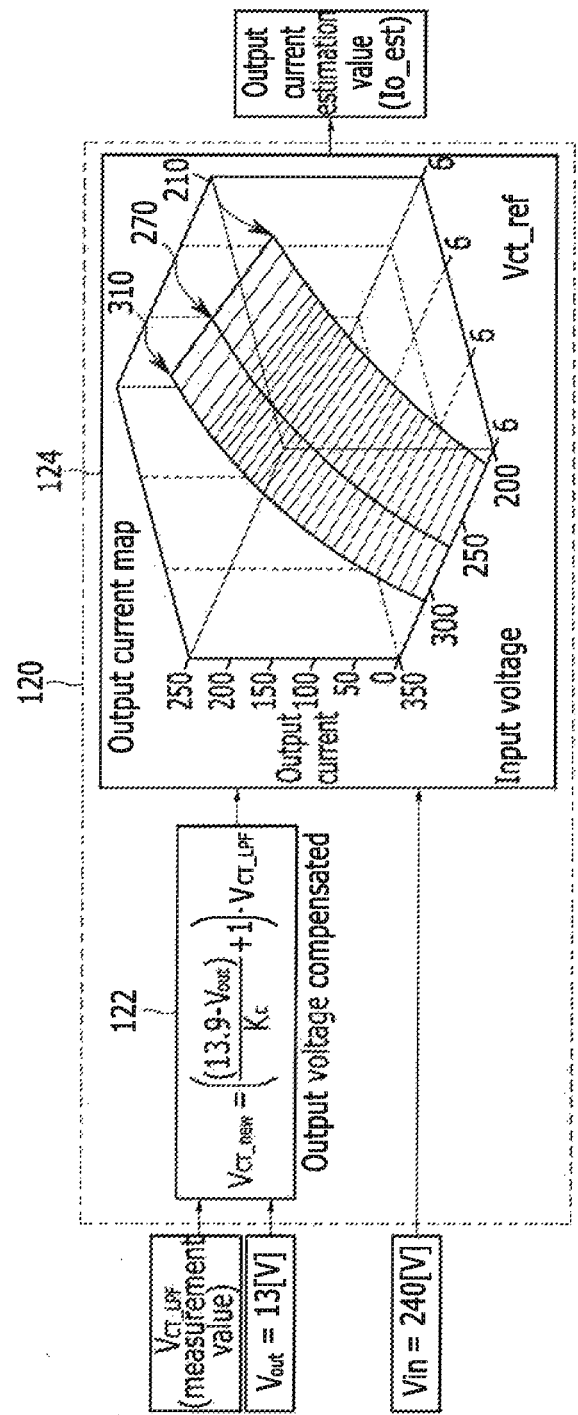
Figure 11:
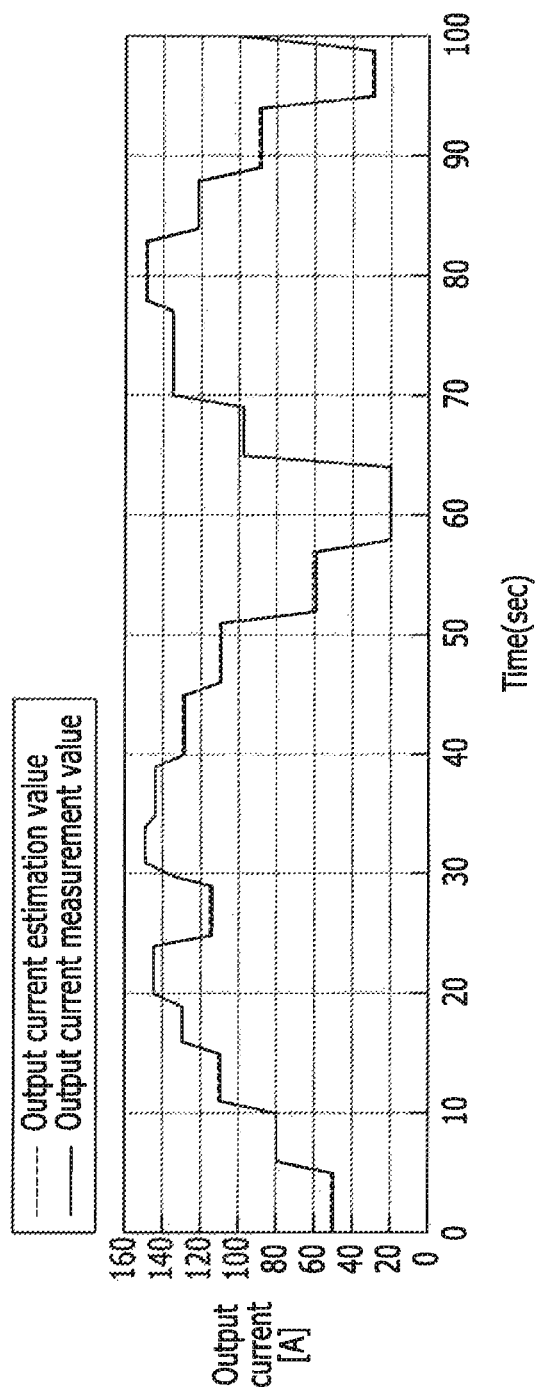

In support of appropriateness of current estimation according to the exemplary method for estimating output current according to an exemplary embodiment of the present invention, an example of current estimation simulation under a predetermined input/output condition of the DC-DC converter 100 is described with reference to FIGS. 10 and 11 as follows.

In particular, CT output voltage may be measured while operating the DC-DC converter 100 is operated under the condition of input voltage of about 240 V and output voltage about 13 V and changing the output voltage into various patterns of about 20-150 A. It can be seen that output current that is the same as the value measured using the current sensor at the maximum error of about 1.5 V or less, as shown in FIG. 11, may be estimated, by comparing the actual output current measurement value with the estimated current value extracted by directly using the CT output voltage measured as described above in the simulation configuration shown in FIG. 10.

Figure 12:
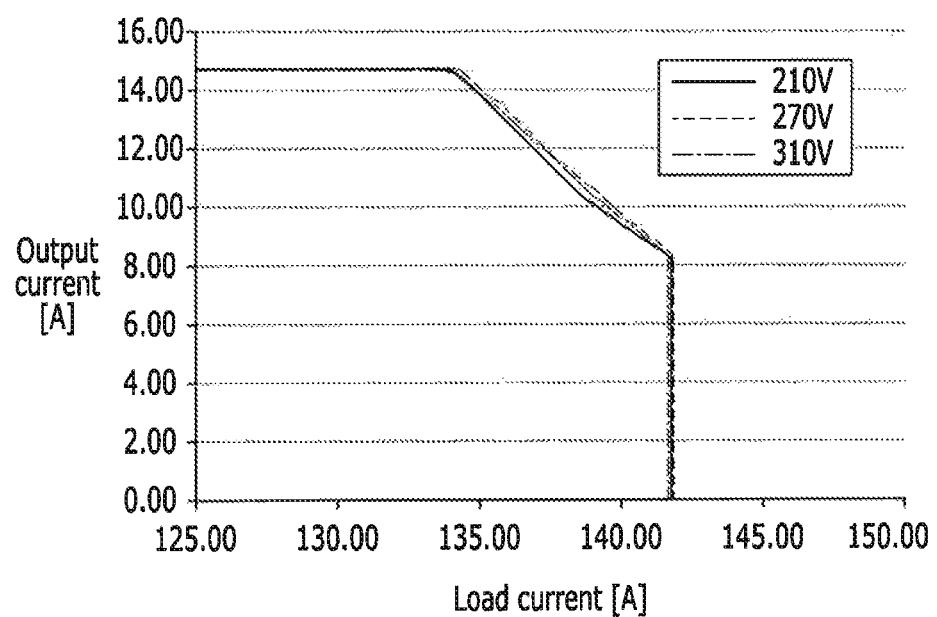

On the other hand, the power derating of the DC-DC converter 100, the final purpose of an exemplary embodiment of the present invention, may be achieved by S200 in FIG. 5. In other words, when the last output current estimation value estimated by the output current estimation device 120, as described above, becomes a predetermined current limit or greater (S210), the DC-DC converter may limit the output power by forcibly reducing the output voltage. For example, when the protection function is performed while the DC-DC converter 100 according to an exemplary embodiment of the present invention is operated under output overcurrent, the power derating function may be performed at various input voltages, as shown in FIG. 12.

As described above, according to an exemplary embodiment of the present invention, it may be possible to remove a calculation equation used in the existing methods by directly constructing an output current map for output current at CT output voltage and to reduce the amount of calculation load of the CPU of the controller of the DC-DC converter by applying a simplified linear compensation equation for a current error based on the output voltage. Therefore, by using an exemplary embodiment of the present invention, it may be possible to reduce the material cost of a DC-DC converter since the same effect as using an output current sensor may be achieved, and it may be possible to reduce the weight of a DC-DC converter. and more freely arrange power parts within a DC-DC converter.

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the accompanying claims.

DESCRIPTION OF SYMBOLS

100: DC-DC converter
120: Output current estimation device
122: Output voltage compensation unit
124: Output current map construction unit

What is claimed is:

1. A method for estimating output current of a direct current-direct current (DC-DC) converter, the method comprising:
measuring, by a controller, input voltage and output voltage of the DC-DC converter;
measuring, by the controller, output voltage of a current transformer included in the DC-DC converter;
compensating, by the controller, for the output voltage by calculating a changed output voltage of the current transformer based on the relationship between the measured output voltage and current transformer (CT) output voltage;
compensating, by the controller, for the input voltage by measuring the input current of the DC-DC converter based on the output current of the DC-DC converter into the CT output voltage converted through the current transformer and using an output current map composed of the output current and the changed output voltage of the current transformer and categorized into three maps for a minimum voltage, a rated voltage, and a maximum voltage based on a range of the input voltage; and
estimating, by the controller, output current by using the compensated output voltage and input voltage.

2. The method of claim 1, wherein the relationship between the measured output voltage and the CT output voltage follows the following Equation (3), $$V_{CT\_new} = \left( \frac{(13.9 - V_{out})}{K_C} + 1 \right) \cdot V_{CT\_LPF} \qquad \text{Equation 3}$$

wherein, $V_{CT\_LPF}$ is the CT output voltage, $V_{out}$ is the output voltage, $V_{CT\_new}$ is a changed output voltage of the current transformer due to a change in input voltage and/or output voltage, and $K_C$ is a tuning coefficient.

3. The method of claim 2, wherein Equation (3) becomes a linear equation by predetermined normalization.

4. The method of claim 3, wherein the output current map is composed of at least three maps based on the range of the input voltage.

5. A direct current-direct current (DC-DC) converter equipped with an output current estimation device, comprising:
a memory configured to store program instructions; and
a processor configured to execute the program instructions, the program instructions when executed configured to:
measure input voltage and output voltage of the DC-DC converter;
measure output voltage of a current transformer (CT) included in the DC-DC converter;
compensate for the output voltage by calculating a changed output voltage of the current transformer based on the relationship between the measured output voltage and CT output voltage;
compensate for the input voltage by measuring the input current of the DC-DC converter based on the output current of the DC-DC converter into the CT output voltage converted through the current transformer and using an output current map composed of the output current and the changed output voltage of the current transformer and categorized into three maps for a minimum voltage, a rated voltage, and a maximum voltage based on a range of the input voltage; and estimate output current using the compensated output voltage and input voltage.

6. The DC-DC converter of claim 5, wherein the DC-DC converter is configured to reduce output voltage to limit output power, when the output current estimation value estimated by the output current estimation device exceeds a predetermined current limit.

7. The DC-DC converter of claim 5, wherein the relationship between the measured output voltage and the CT output voltage follows the following Equation (3), $$V_{CT\_new} = \left(\frac{(13.9 - V_{out})}{K_C} + 1\right) \cdot V_{CT\_LPF} \qquad \text{Equation 3}$$

wherein, $V_{CT\_LPF}$ is the CT output voltage, $V_{out}$ is the output voltage, $V_{CT\_new}$ is a changed output voltage of the current transformer due to a change in input voltage and/or output voltage, and $K_C$ is a tuning coefficient.

8. A non-transitory computer readable medium containing program instructions executed by a controller, the computer readable medium comprising:

program instructions that measure output voltage of a current transformer (CT) included in the DC-DC converter;

program instructions that compensate for the output voltage by calculating a changed output voltage of the current transformer based on the relationship between the measured output voltage and CT output voltage;

program instructions that compensate for the input voltage by measuring the input current of the DC-DC converter based on the output current of the DC-DC converter into the CT output voltage converted through the current transformer and using an output current map composed of the output current and the changed output voltage of the current transformer and categorized into three maps for a minimum voltage, a rated voltage, and a maximum voltage based on a range of the input voltage; and program instructions that estimate output current using the compensated output voltage and input voltage.

9. The non-transitory computer readable medium of claim 8, wherein the DC-DC converter is configured to reduce output voltage to limit output power, when the output current estimation value estimated by the output current estimation device exceeds a predetermined current limit.

10. The non-transitory computer readable medium of claim 8, wherein the relationship between the measured output voltage and the CT output voltage follows the following Equation (3), $$V_{CT\_new} = \left(\frac{(13.9 - V_{out})}{K_C} + 1\right) \cdot V_{CT\_LPF} \qquad \text{Equation 3}$$

wherein, $V_{CT\_LPF}$ is the CT output voltage, $V_{out}$ is the output voltage, $V_{CT\_new}$ is a changed output voltage of the current transformer due to a change in input voltage and/or output voltage, and $K_C$ is a tuning coefficient.

* * * * *